US008526514B2

(12) United States Patent
Kim et al.

(10) Patent No.: US 8,526,514 B2
(45) Date of Patent: Sep. 3, 2013

(54) METHOD AND APPARATUS FOR ALLOCATING A PLURALITY OF DATA SYMBOLS IN A WIRELESS COMMUNICATION SYSTEM

(75) Inventors: Hak Seong Kim, Seoul (KR); Bong Hoe Kim, Anyang-si (KR); Dong Wook Roh, Seoul (KR); Joon Kui Ahn, Seoul (KR); Dong Youn Seo, Seoul (KR); Jung Hoon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 588 days.

(21) Appl. No.: 11/917,903

(22) PCT Filed: Jun. 13, 2006

(86) PCT No.: PCT/KR2006/002253
§ 371 (c)(1),
(2), (4) Date: Dec. 17, 2007

(87) PCT Pub. No.: WO2006/135186
PCT Pub. Date: Dec. 21, 2006

(65) Prior Publication Data
US 2008/0212698 A1   Sep. 4, 2008

(30) Foreign Application Priority Data
Jun. 15, 2005 (KR) .................. 10-2005-0051558

(51) Int. Cl.
*H04L 27/28* (2006.01)
(52) U.S. Cl.
USPC ........... 375/260; 375/267; 375/295; 375/299; 375/296; 375/259

(58) Field of Classification Search
USPC .................. 375/260, 267, 295, 299, 296, 259
See application file for complete search history.

(56) References Cited

U.S. PATENT DOCUMENTS

| 7,418,039 B2 * | 8/2008 | Simmonds ..................... 375/260 |
| 7,430,243 B2 * | 9/2008 | Giannakis et al. ............ 375/267 |
| 7,756,521 B2 * | 7/2010 | Gerlach et al. ................ 455/450 |
| 7,773,946 B2 * | 8/2010 | Lee et al. ........................ 455/45 |

(Continued)

FOREIGN PATENT DOCUMENTS

| KR | 1020020056986 | 7/2002 |
| KR | 20050048861 | 5/2005 |
| KR | 1020050051865 | 6/2005 |
| WO | 2004084435 | 9/2004 |

OTHER PUBLICATIONS

Motorola, "Uplink Numerology and Frame Structure," 3GPP TSG RAN1#41 Meeting, R1-050397, May 2005.

(Continued)

*Primary Examiner* — Siu Lee
(74) *Attorney, Agent, or Firm* — Lee, Hong, Degerman, Kang & Waimey

(57) ABSTRACT

A method of allocating a plurality of data symbols from a transmitting end using multiple carrier modulation (MCM) is disclosed. More specifically, the method includes receiving the plurality of data symbols from a serial-to-parallel converter, grouping the plurality data symbols into at least one data symbol group, wherein the at least one data symbol group is formed by grouping a specified number of neighboring data symbols, and allocating the at least one data symbol group to at least one subcarrier group, wherein the at least one subcarrier group is formed by grouping a plurality of subcarriers.

11 Claims, 7 Drawing Sheets

(56) References Cited

U.S. PATENT DOCUMENTS

| | | | |
|---|---|---|---|
| 2004/0005022 A1* | 1/2004 | Zhu et al. | 375/365 |
| 2004/0190640 A1 | 9/2004 | Dubuc et al. | |
| 2004/0196780 A1 | 10/2004 | Chin et al. | |
| 2004/0208232 A1* | 10/2004 | Sudo | 375/146 |
| 2005/0018782 A1* | 1/2005 | Costa et al. | 375/260 |
| 2005/0058212 A1* | 3/2005 | Shao | 375/260 |
| 2005/0068886 A1* | 3/2005 | Wang et al. | 370/210 |
| 2005/0111406 A1* | 5/2005 | Pasanen et al. | 370/329 |
| 2005/0128936 A1* | 6/2005 | Shao | 370/208 |
| 2005/0128993 A1* | 6/2005 | Yu et al. | 370/342 |
| 2005/0185605 A1* | 8/2005 | Cho et al. | 370/320 |
| 2005/0195732 A1* | 9/2005 | Huh et al. | 370/206 |
| 2005/0195910 A1* | 9/2005 | Kim et al. | 375/260 |
| 2005/0201476 A1* | 9/2005 | Kim et al. | 375/260 |
| 2005/0220200 A1* | 10/2005 | Giannakis et al. | 375/260 |
| 2005/0249127 A1* | 11/2005 | Huo et al. | 370/252 |
| 2006/0072649 A1* | 4/2006 | Chang et al. | 375/132 |
| 2006/0072678 A1* | 4/2006 | Hadad | 375/260 |
| 2006/0120473 A1* | 6/2006 | Baum | 375/260 |
| 2006/0262870 A1* | 11/2006 | Khan | 375/260 |
| 2007/0091866 A1* | 4/2007 | Nangia et al. | 370/344 |
| 2007/0263743 A1* | 11/2007 | Lee et al. | 375/267 |
| 2010/0238833 A1* | 9/2010 | Li et al. | 370/252 |

OTHER PUBLICATIONS

Sakakura, S., et al., "Pre-diversity using coding, multi-carriers and multi-antenas", Universal Personal Communications 1995 Fourth IEEE International Conference on Nov. 6-10, 1995, Tokyo, Japan.

Galda, et al. "A Low Complexity Transmitter Structure for OFDM-FDMA Uplink Systems", IEEE 55th Vehicular Technology Conference, May 2002.

Dinis, et al., "A Multiple Access Scheme for the Uplink of Broadband Wireless Systems", IEEE Global Telecommunications Conference, Nov. 2004.

Cai, et al., "Group-Orthogonal Multicarrier CDMA", IEEE Transactions on Communications, Jan. 2004.

Xu, et al., "Group-Orthogonal OFDMA in Fast Time-Varying Frequency-Selective Fading Environments", IEEE 60th Vehicular Technology Conference, Sep. 2004.

Sakakura, et al., "Pre-Diversity using Coding, Multi-carriers and Multi-antennas", IEEE International Conference on Universal Personal Communications, Nov. 1995.

* cited by examiner

METHOD AND APPARATUS FOR ALLOCATING A PLURALITY OF DATA SYMBOLS IN A WIRELESS COMMUNICATION SYSTEM

CROSS-REFERENCE TO RELATED APPLICATIONS

This application is the National Stage filing under 35 U.S.C. 371 of International App. No. PCT/KR2006/002253 filed on Jun. 13, 2006, which claims the benefit of earlier filing date and right of priority to Korean App. No. 10-2005-0051558 filed Jun. 15, 2005.

TECHNICAL FIELD

The present invention relates to a method and apparatus for allocating data symbols, and more particularly, to a method and apparatus for allocating a plurality of data symbols in a wireless communication system. Although the present invention is suitable for a wide scope of applications, it is particularly suitable for more efficiently allocating the data symbols.

BACKGROUND ART

An Orthogonal Frequency Division Multiplexing (OFDM) scheme or an Orthogonal Frequency Division Multiple Access (OFDMA) scheme is used for transmitting high speed data in wired and/or wireless channels. These schemes are actively being researched. In the OFDM scheme, frequency usage efficiency increases since this scheme employs a plurality of subcarriers having mutual orthogonality. In the transmitting end and the receiving end, a process of modulating and demodulating the plurality of subcarriers are similar to performing an Inverse Discrete Fourier Transform (IDFT) and a Discrete Fourier Transform (DFT), respectively. As such, an Inverse Fast Fourier Transform (IFFT) and Fast Fourier Transform (FFT) are used to achieve high speed data communication.

The principle of OFDM scheme includes dividing a high speed data stream into a plurality of low speed data streams which are then transmitted via the plurality of subcarriers. By using the subcarriers to transmit the plurality of low speed data streams, symbol duration is increased which in turn works to reduce relative dispersion in a time domain based on multi-path delay spread. In the OFDM scheme, the data is transmitted in units of transmission symbols.

In an OFDMA physical (PHY) layer, active carriers are divided into groups, and each group is transmitted to different receiving ends. These groups of carriers are referred to as sub-channels. Each sub-channel comprised of carriers can be close in proximity with each other or spaced equally apart from each other. By permitting multi-access per sub-channel, although transmission of the carriers becomes more complex, frequency diversity gain, gain based on focusing the power, and efficient execution of omni-directional power control can be attained.

FIG. 1 illustrates a block diagram of transmitting/receiving ends using an OFDMA scheme in an uplink direction. First, a data stream is mapped using a modulation technique (e.g., Quadrature Phase Shift Keying, 16 Quadrature Amplitude Modulation) and then is converted into Nu number of parallel data using serial-to-parallel conversion. From total of Nc number of subcarriers, these symbols are mapped to Nu number of subcarriers while remaining subcarriers (Nc-Nu) are padded (e.g., zero padding). Thereafter, Nc-point IFFT is performed to the symbols.

In order to reduce inter-symbol interference, a cyclic prefix is added to the symbols and then transmitted after the symbols are converted using parallel-to-serial conversion. The operation of the receiving end is the same process of that of the transmitting end except in reverse order. A different user's data can be transmitted using an available subcarrier from unused subcarriers (e.g., Nc-Nu).

FIGS. 2a-2c illustrate methods of mapping Nu number of subcarriers out of Nc total number of subcarriers. FIG. 2a illustrates a random allocation of subcarriers, FIG. 2b illustrates allocating the subcarriers by collecting the subcarriers in specified frequency bands, and FIG. 2c illustrates allocating each subcarrier throughout the entire frequency bands in equal intervals.

Since the mapping methods illustrated in FIGS. 2a-2c make use of the entire frequency bands, frequency diversity can be achieved. However, because each subcarrier is allocated individually, timing synchronization of OFDM symbol of different users can be off, and signal quality can suffer due to nearby subcarriers of different users if Doppler frequency is large. Furthermore, in the conventional OFDMA scheme, a single user uses a plurality of subcarriers and as a result, poor Peak-to-Average Power Ratio (PAPR) characteristics can appear and an expensive power amplifier is needed to resolve the poor PAPR problem.

In order to alleviate the poor PAPR characteristics, a DFT spread OFDMA scheme has been proposed. The DFT spread OFDMA scheme is a data symbol precoding method using DFT matrix. FIG. 3 is a block diagram illustrating transmitting/receiving ends using a DFT spread OFDMA scheme.

The difference between the DFT spread OFDMA scheme and the conventional OFDMA scheme is that in the DFT spread OFDMA, Nu number of data symbols are Nu-point DFTed. Thereafter, as illustrated in FIG. 2c, the converted data symbols are mapped in equal intervals to the entire Nc number of subcarriers. In addition, although the PAPR can be drastically improved by using the DFT spread OFDMA, the function of the DFT spread OFDMA easily heats up due to an Inter Channel Interference (ICI).

DISCLOSURE OF THE INVENTION

Accordingly, the present invention is directed to a method and apparatus for allocating data symbols in a wireless communication system that substantially obviates one or more problems due to limitations and disadvantages of the related art.

An object of the present invention is to provide a method of allocating a plurality of data symbols from a transmitting end of using multiple carrier modulation (MCM).

Another object of the present invention is to provide an apparatus for allocating a plurality of data symbols using multiple carrier modulation (MCM).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of allocating a plurality of data symbols from a transmitting end using multiple carrier modulation (MCM) includes receiving the plurality of data symbols from a serial-to-parallel converter, grouping the plurality data symbols into at least one data symbol group, wherein the at least one data symbol group is formed by grouping a specified number of neighboring data symbols, and allocating the at least one data symbol group to at least one subcarrier group, wherein the at least one subcarrier group is formed by grouping a plurality of subcarriers.

In another aspect of the present invention, a method includes receiving the plurality of data symbols from a serial-to-parallel converter, precoding the plurality of data symbols by a precoding matrix of the at least one precoding module, grouping the plurality precoded data symbols to at least one data symbol group, wherein the at least one data symbol group is formed by grouping precoded data symbols that are spaced apart in specified intervals, and allocating the at least one data symbol group to at least one subcarrier group, wherein each subcarrier group comprises at least one subcarrier and is formed by grouping a plurality of subcarriers.

In a further aspect of the present invention, a method includes receiving the plurality of data symbols from a serial-to-parallel converter, precoding the plurality of data symbols by a precoding matrix of the at least one precoding module, grouping the plurality precoded data symbols to at least one data symbol group, wherein the at least one data symbol group is formed by grouping a specified number of neighboring data symbols, and allocating the at least one data symbol group to at least one subcarrier group, wherein each subcarrier group comprises at least one subcarrier and is formed by grouping a plurality of subcarriers.

Yet, in another aspect of the present invention, an apparatus includes a subcarrier-to-symbol mapping modules for receiving the plurality of data symbols from a serial-to-parallel converter, grouping the plurality data symbols into at least one data symbol group, wherein the at least one data symbol group is formed by grouping a specified number of neighboring data symbols, and allocating the at least one data symbol group to at least one subcarrier group, wherein the at least one subcarrier group is formed by grouping a plurality of subcarriers. The apparatus further includes a transmitting module for transmitting the data symbols on the subcarriers of the at least one subcarrier group to a receiving end.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, the descriptions of the embodiments will be made with respect to the OFDMA which is one of many a Multiple Carrier Modulation (MCM) scheme. However, that is merely an exemplary scheme and can be allocated using other types of modulation schemes.

Figure 1:
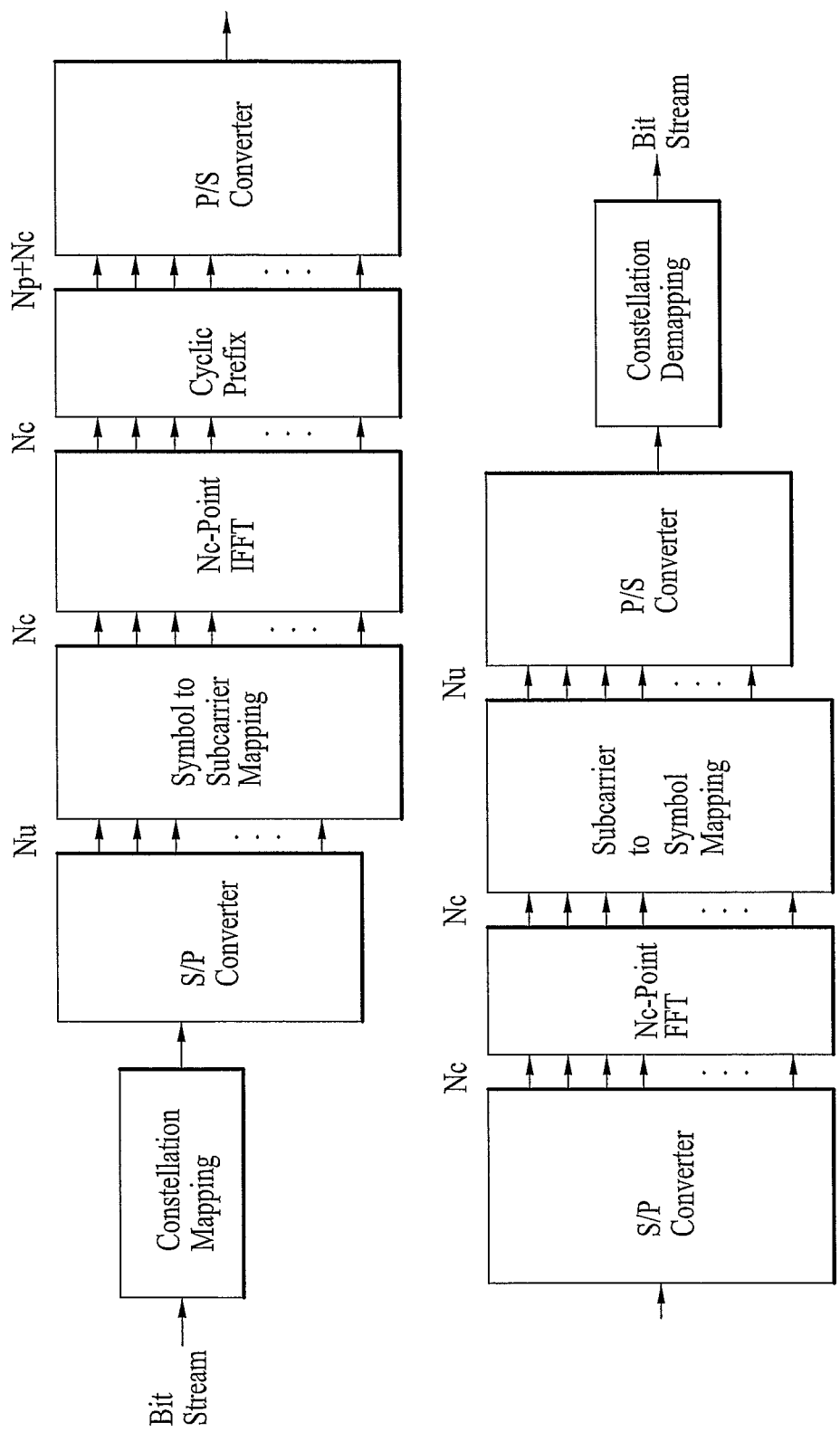
FIG. 1 illustrates a block diagram of transmitting/receiving ends using an OFDMA scheme in an uplink direction.
Figure 2A:
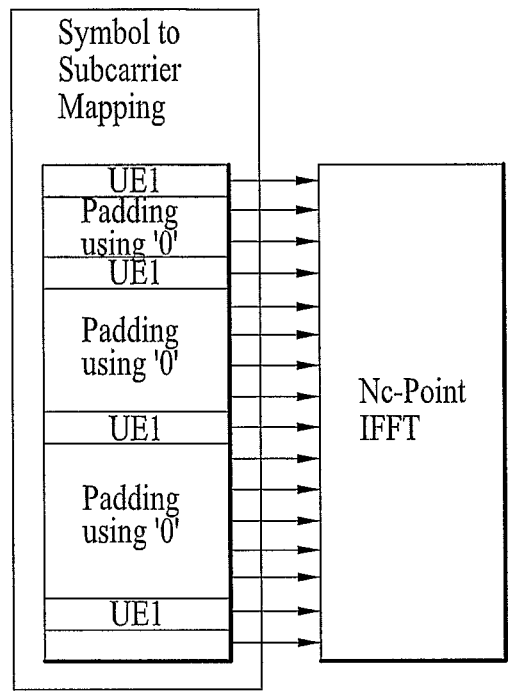
FIGS. 2a-2c illustrate methods of mapping Nu number of subcarriers out of Nc total number of subcarriers.
Figure 2B:
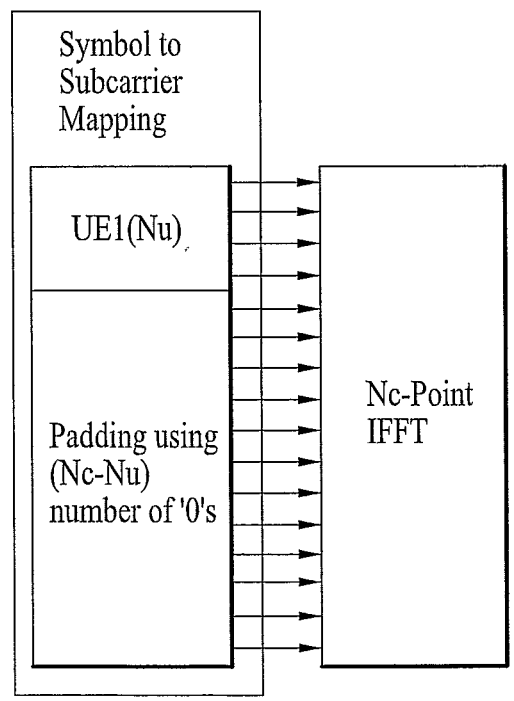
Figure 2C:
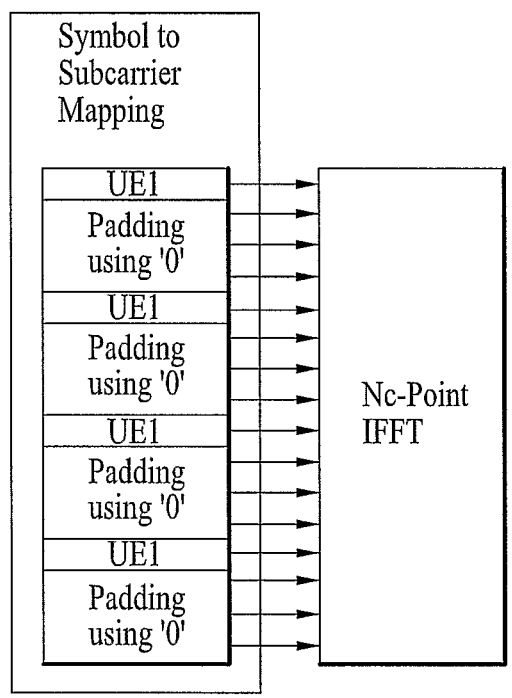
Figure 3:
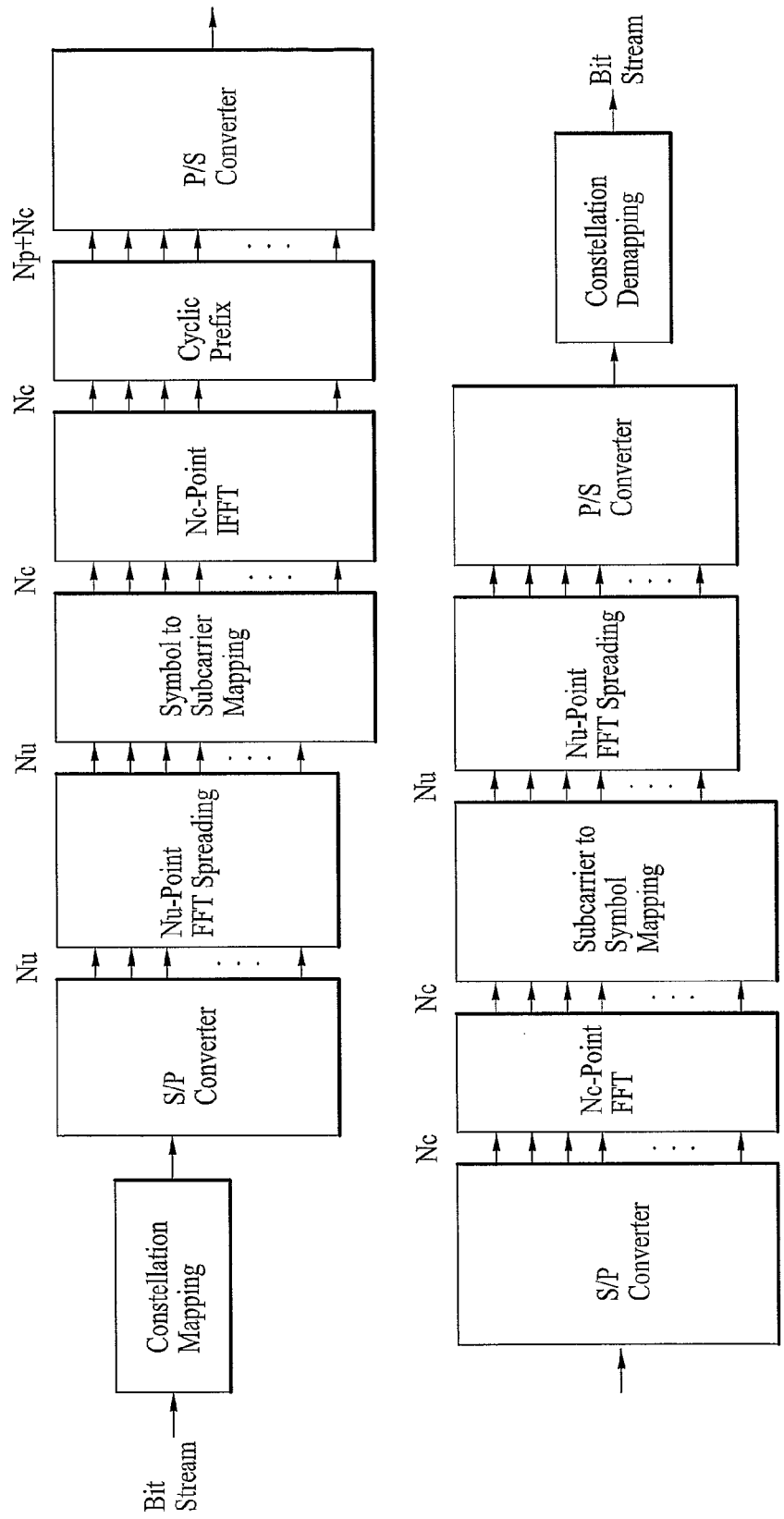
FIG. 3 is a block diagram illustrating transmitting/receiving ends using a DFT spread OFDMA scheme.

To resolve the ICI problem as well as other problems in the DFT spread OFDMA system, the following embodiments are provided. As illustrated in FIG. 1, a bit stream of a user (e.g., mobile station) is mapped by a constellation mapping scheme which is then converted by a serial-to-parallel converter. The descriptions provided hereafter with respect to the present invention relate to mapping the data symbols to subcarriers. In the present invention, the processed bit stream is not limited to a bit stream of a single user but can be multiplexed bit streams of more than one user (e.g., bit stream of user 1, bit stream of user 2, and bit stream of user 3). In addition, although the present invention is geared for downlink transmission, the present invention can also be applied to uplink transmissions.

Figure 4:
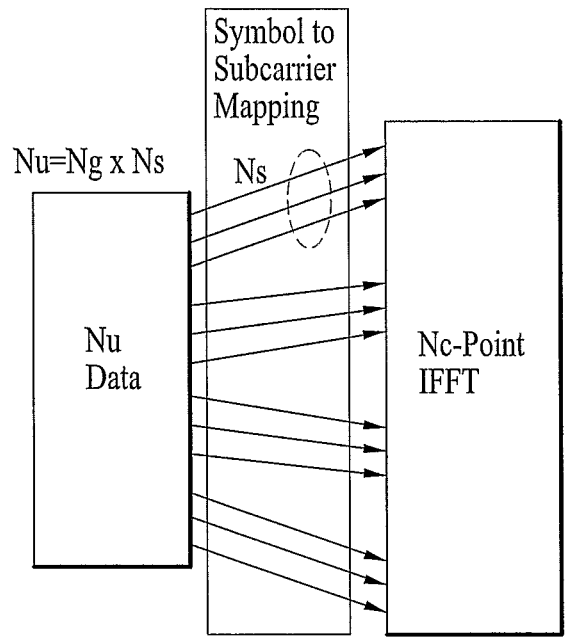
FIG. 4 illustrates a subcarrier allocation method according an embodiment of the present invention.

FIG. 4 illustrates a subcarrier allocation method according an embodiment of the present invention. As illustrated in FIG. 4, a number of data symbols are grouped into a plurality of groups, and these groups comprised of data symbols are allocated. More specifically, in order to achieve frequency diversity in an OFDMA system, Nu number of data symbols are allocated across the entire frequency band having Nc number of subcarriers when Ns number of neighboring data symbols are formed into a group, making a total of Ng number of data symbol groups (i.e., Nu=Ng×Ns). That is, Nu number of data symbols is grouped based on proximity of data symbols (e.g., neighboring data symbols). Usually, the grouping occurs based on close proximity of the data symbols with respect to each other. The break up of Nu number of data symbols is based on Ng number of data symbol groups, which contains Ns number of elements or data symbols. For example, assuming Nu=12, if four data symbol groups are formed (Ng=4), then the data symbols that are in close proximity form a data symbol group of three data symbols (Ns=3). This is depicted in FIG. 4.

Thereafter, the data symbol groups are allocated to subcarrier groups. Here, each data symbol group is allocated to each subcarrier group, where each subcarrier group comprises a plurality of subcarriers. In allocating each data symbol group to each subcarrier group, an ICI should affect only the subcarriers located on the periphery of the data symbol group so as to express strong characteristics of the ICI. Preferably, the subcarrier groups are offset or spaced apart a certain distance between neighboring subcarrier groups. Furthermore, it is preferable to allocate groups by distributing the subcarrier groups across the entire frequency band.

FIGS. 5a-5d illustrate subcarrier allocation methods according to other embodiments of the present invention. More specifically, these embodiments illustrate application of the DFT spread OFDMA scheme.

Figure 5A:
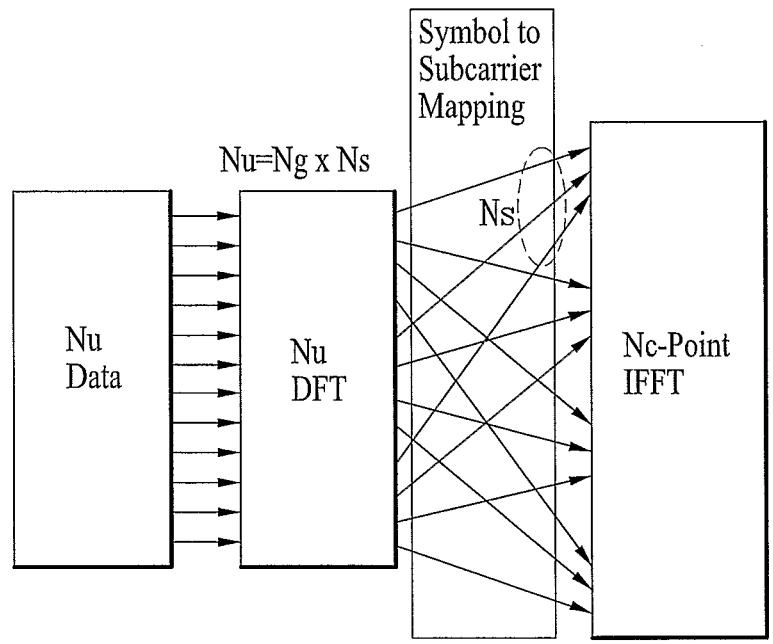
FIGS. 5a-5d illustrate subcarrier allocation methods according to other embodiments of the present invention.

In FIG. 5a, after being processed by the serial-to-parallel converter, Nu number of data symbols are precoded or spread by a precoding module. Here, the precoding module uses Nu-point DFT scheme. Thereafter, the output values (e.g., precoded data symbols) spaced apart at specified intervals (e.g., every fourth precoded data symbol) are joined to form a data symbol group. The grouping of precoded data symbols are performed until all of the precoded data symbols are placed in data symbol groups. Here, Nu number of precoded data symbols are grouped into Ng number of data symbol groups and each data symbol group consists of Ns number of precoded data symbols. Subsequently, these data symbol groups are allocated to subcarrier groups whose group formation corresponds to the data symbol groups. Each subcarrier group is formed by combining a certain number of subcarriers from Nc number of subcarriers. Here, the data symbols can be transmitted from more than one mobile station.

For example, if Nu=12 and Nc=24 and the DFT output values are {1, 2, 3, 4, 5, 6, 7, 8, 9, 10, 11, 12}, these output values are grouped into data symbol groups (e.g., {1, 5, 9}, {2, 6, 10}, {3, 7, 11}, {4, 8, 12}) where there are four (4) data symbol groups, Ng=4, and three precoded data symbols per each group, Ns=3. In this example, the size of Ns is set to 3 data symbols. However, the size of Ns can vary and does not have to be fixed. In other words, each data symbol group can have different size of Ns. For example, the data groups having different number of data symbols per group can be assembled, such as {1, 4, 9}, {2, 10}, {3, 6, 8, 11}, {5, 7, 12}.

Once the formation of the data symbol groups are completed, each data symbol group (Ng) is allocated to respective subcarrier groups (e.g., {1, 2, 3}, {7, 8, 9}, {13, 14, 15}, {19, 20, 21} or {4, 5, 6}, {10, 11, 12}, {16, 17, 18}, {22, 23, 24}) which are formed by grouping Nc number of subcarriers. Here, the subcarriers of the subcarriers groups are localized. That is, the subcarriers of each subcarrier group are adjacent to each other or put differently, are neighboring subcarriers. However, grouping of subcarriers for the subcarrier group is not limited to grouping localized or neighboring subcarriers. The subcarrier groups can group subcarriers that are not close to each other. That is, the subcarriers of each subcarrier group can have various patterns. As such, non-localized subcarriers or subcarriers that are dispersed can be grouped to form each subcarrier group. (e.g., {1, 9, 17}, {3, 11, 19}, {5, 13, 21}, {7, 15, 23}).

In addition, the size of each subcarrier group which corresponds to the size of the data symbol group does not have to be fixed. As described above, each data symbol group size can vary. Accordingly, to correspond with the varying data symbol group size, the subcarrier group size can vary as well. That is, each subcarrier group can be of different size (e.g., {1, 2}, {6, 7, 8, 9}, {14, 15, 16}, {19, 20, 21, 22}).

By combining the non-localized subcarriers with different subcarrier group size, it is also possible for the subcarrier group to have different size subcarrier groups, in which the subcarrier groups are dispersed and not localized. For example, the subcarrier groups can be {1, 7}, {4, 9, 15, 24}, {2, 10}, {5, 12, 21}.

As described above, the data symbol groups can have a fixed as well as a varying group size. In addition, the subcarrier groups can also be fixed and/or varying as well. This is true since the size of subcarrier groups correspond to the size of the data symbols. Moreover, the subcarriers included in the subcarrier groups are either localized subcarriers or non-localized (dispersed) subcarriers. Here, the detailed description of the data symbol groups and the subcarrier groups is not limited to FIG. 5a but can also be applied to the embodiments of FIGS. 5b-5d.

Figure 5B:
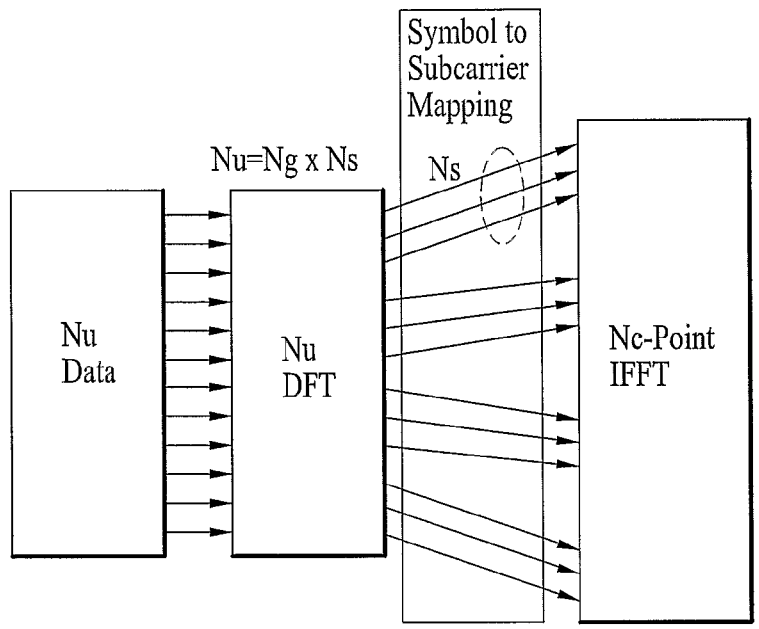

In FIG. 5b, after being processed by the serial-to-parallel converter, Nu number of data symbols are precoded (or spread) by a precoding module. Here, the precoding module uses Nu-point DFT scheme. Thereafter, Ns number of neighboring DFT output values are grouped, totaling Ng number of data symbol groups. Here, the neighbor DFT output values represent values that are close each other. Thereafter, the data symbol groups, consisting of the DFT output values (precoded data symbols), are allocated to subcarriers groups, each of which correspond to each data symbol group. Each subcarrier group is formed by combining a certain number of subcarriers from Nc number of subcarriers and has the same group formation as the data symbol group.

For example, if Nu=12 and Nc=24 and the DFT output values (i.e., precoded data symbols) are {1, 2, 3, 4, 5, 6, 7, 8, 9, 10, 11, 12}, these output values or data symbols are grouped into data symbol groups (e.g., {1, 2, 3}, {4, 5, 6}, {7, 8, 9}, {10, 11, 12}) where there are four (4) data symbol groups, Ng=4, and three data symbols per group, Ns=3. Once the formation of the data symbol groups are completed, each data symbol group is allocated to subcarrier groups (e.g., {1, 2, 3}, {7, 8, 9}, {13, 14, 15}, {19, 20, 21} or {4, 5, 6}, {10, 11, 12}, {16, 17, 18}, {22, 23, 24}) which are formed by grouping Nc number of subcarriers.

Figure 5C:
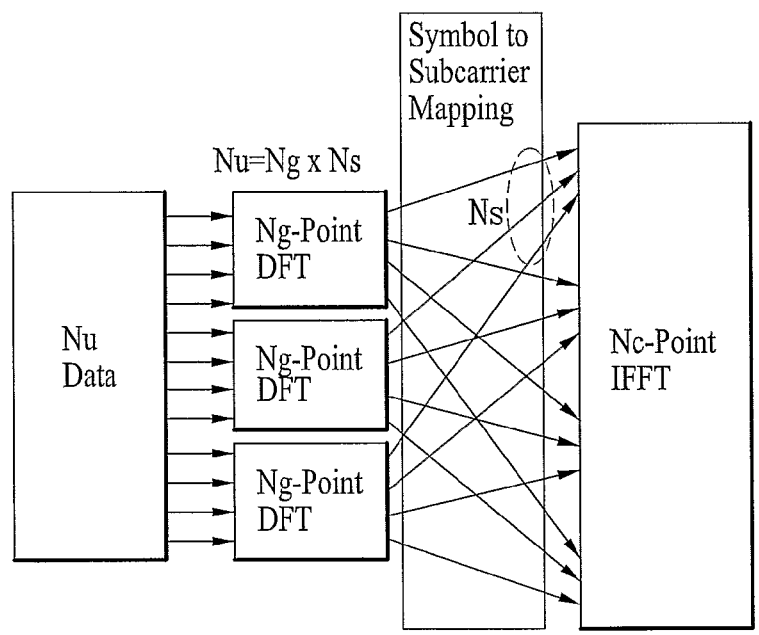

In FIG. 5c, after being processed by the serial-to-parallel converter, Nu number of data symbols are spread (precoded) by Ng number of precoding or spreading modules. Here, the precoding module uses Ng-point DFT spreading scheme. Thereafter, the precoded data symbols are outputted to different parts of the frequency band. For example, if there are four outputted values from a precoding module, each of these four outputted data symbols are spread apart so that they are evenly spaced apart across the frequency band. As illustrated in FIG. 5c, there are Ng number of precoding modules, and each precoding module processes Ns number of data symbols. The outputted precoded data symbols from each precoding module are spaced apart in equal intervals. Thereafter, precoded data symbols from each precoding module spaced apart at specified intervals are grouped into data symbol groups to which subcarriers groups are allocated. Preferably, for example, each data symbol group combines only one outputted precoded data symbol from each precoding module. Each subcarrier group is formed by combining a certain number of subcarriers from Nc number of subcarriers.

For example, if Nu=12 and Nc=24 and a 4-point DFT output values are, in order, {1, 2, 3, 4}, {5, 6, 7, 8}, {9, 10, 11, 12}, the output values are grouped into four data symbol groups (e.g., {1, 5, 9}, {2, 6, 10}, {3, 7, 11}, {4, 8, 12}) where Ng=4 having three precoded data symbols in each data symbol group, Ns=3. Once the formation of the data symbol groups are completed, each data symbol group is allocated to subcarrier groups (e.g., {1, 2, 3}, {7, 8, 9}, {13, 14, 15}, {19, 20, 21} or {4, 5, 6}, {10, 11, 12}, {16, 17, 18}, {22, 23, 24}) which are formed by grouping Nc number of subcarriers.

Figure 5D:
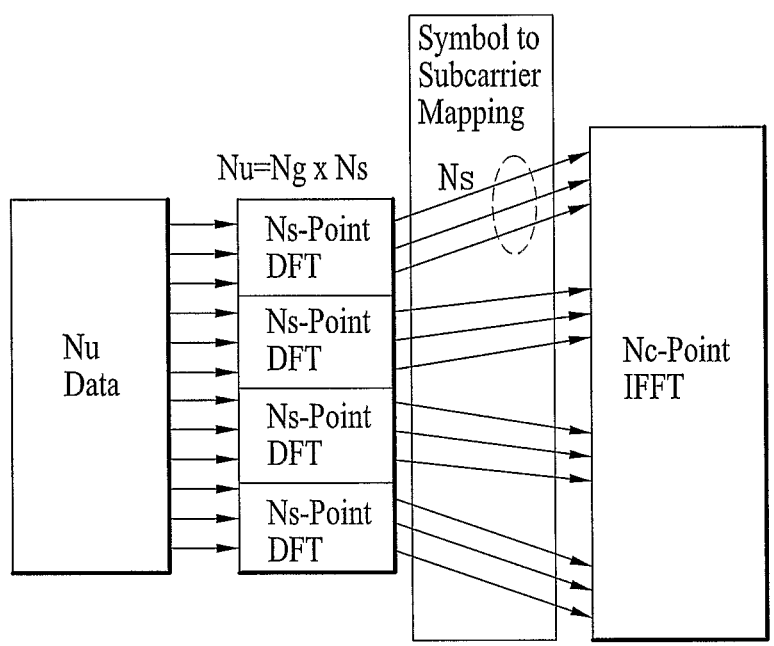

In FIG. 5d, after being processed by the serial-to-parallel converter, Nu number of data symbols are spread by Ng number of precoding modules. Here, the precoding module employs Ns-point DFT scheme. Thereafter, the precoded data symbols are outputted to different parts of the frequency band. As illustrated in FIG. 5d, there are Ng number of precoding modules, each module processing Ns number of data symbols. Here, Ns number of outputted precoded data symbols, considered to be neighboring DFT output values, are grouped, totaling Ng number of data symbol groups. Here, the neighbor DFT output values represent values that are close each other. Thereafter, the data symbol groups are allocated to subcarrier groups. Each subcarrier group is formed by combining a certain number of subcarriers from Nc number of subcarriers.

For example, if Nu=12 and Nc=24 and a 3-point DFT output values are, in order, {1, 2, 3}, {4, 5, 6}, {7, 8, 9}, {10, 11, 12}, the output values are grouped into data symbol groups where Ng=4 and Ns=3. Once the formation of the data symbol groups are completed, each data symbol group is allocated to subcarrier groups (e.g., {1, 2, 3}, {7, 8, 9}, {13, 14, 15}, {19, 20, 21} or {4, 5, 6}, {10, 11, 12}, {16, 17, 18}, {22, 23, 24}) which are formed by grouping Nc number of subcarriers.

In another embodiment of the present invention, an apparatus for allocating the data symbols can be found. The apparatus includes a subcarrier-to-symbol mapping module through which the data symbols are grouped and mapped to at least one subcarrier group. The apparatus further includes a transmitting module for transmitting the data symbols on the subcarriers of the at least one subcarrier group to a receiving end. Since the operations are same as described above with respect to FIGS. 5a-5d, further discussions of the operations will be omitted. For details, refers to the descriptions of FIGS. 5a-5d.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of allocating a plurality of data symbols for uplink transmission from a mobile station using Orthogonal Frequency Division Multiple Access (OFDMA), the method comprising:
    allocating each of the plurality of data symbols to a subcarrier of one of a plurality of subcarrier groups; and
    transmitting the allocated plurality of data symbols to a base station,
    wherein each of the plurality of subcarrier groups is formed by grouping only a single plurality of adjacent subcarriers,
    wherein each of the plurality of subcarrier groups is spaced apart a certain distance from neighboring subcarrier groups such that the plurality of subcarrier groups are not contiguous in frequency, and
    wherein at least two consecutive data symbols of the plurality of data symbols are allocated in sequence to at least two subcarriers of a subcarrier group of the plurality of subcarrier groups in order of increasing subcarrier number in an OFDM symbol.

2. The method of claim 1, further comprising:
    precoding the plurality of data symbols using a precoding matrix.

3. The method of claim 1, wherein each of the plurality of data symbols is associated with at least one mobile station (MS).

4. The method of claim 1, wherein the single plurality of adjacent subcarriers are orthogonal to each other.

5. A method of allocating a plurality of data symbols for uplink transmission from a mobile station using Orthogonal Frequency Division Multiple Access (OFDMA), the method comprising:
    precoding the plurality of data symbols using a precoding matrix of at least one precoding module;
    allocating each of the precoded plurality of data symbols to a subcarrier of one of a plurality of subcarrier groups; and
    transmitting the allocated plurality of data symbols to a base station,
    wherein each of the plurality of subcarrier groups is formed by grouping only a single plurality of adjacent subcarriers,
    wherein each of the plurality of subcarrier groups is spaced apart a certain distance from neighboring subcarrier groups such that the plurality of subcarrier groups are not contiguous in frequency, and
    wherein at least two consecutive data symbols of the precoded plurality of data symbols are allocated in sequence to at least two subcarriers of a subcarrier group of the plurality of subcarrier groups in order of increasing subcarrier number in an OFDM symbol.

6. The method of claim 5, wherein the precoding matrix is a Discrete Fourier Transform (DFT) matrix.

7. The method of claim 5, wherein each of the plurality of subcarrier groups varies in size.

8. The method of claim 5, wherein each of the plurality of subcarrier groups is equivalent in size.

9. The method of claim 5, wherein the single plurality of adjacent subcarriers are orthogonal to each other.

10. An apparatus for allocating a plurality of data symbols for uplink transmission using Orthogonal Frequency Division Multiple Access (OFDMA), the apparatus comprising:
    a symbol-to-subcarrier mapping module, wherein the plurality of data symbols are input to the symbol-to-subcarrier mapping module and are output from a precoding module,
    wherein, at the symbol-to-subcarrier mapping module, each of the plurality of data symbols is allocated to a subcarrier of one of a plurality of subcarrier groups to transmit the allocated plurality of data symbols to a receiving end,
    wherein each of the plurality of subcarrier groups is formed by grouping only a single plurality of adjacent subcarriers,
    wherein each of the plurality of subcarrier groups is spaced apart a certain distance from neighboring subcarrier groups such that the plurality of subcarrier groups are not contiguous in frequency, and
    wherein the symbol-to-subcarrier mapping module is further configured to allocate each of the plurality of data symbols by allocating at least two consecutive data symbols of the plurality of data symbols in sequence to at least two subcarriers of a subcarrier group of the plurality of subcarrier groups in order of increasing subcarrier number in an OFDM symbol.

11. The apparatus of claim 10, wherein, at the precoding module, the plurality of data symbols are precoded using a precoding matrix.

* * * * *